L. E. VOIGTS.
COLLAPSIBLE EGG CASE.
APPLICATION FILED OCT. 20, 1917.
1,257,770.
Patented Feb. 26, 1918.
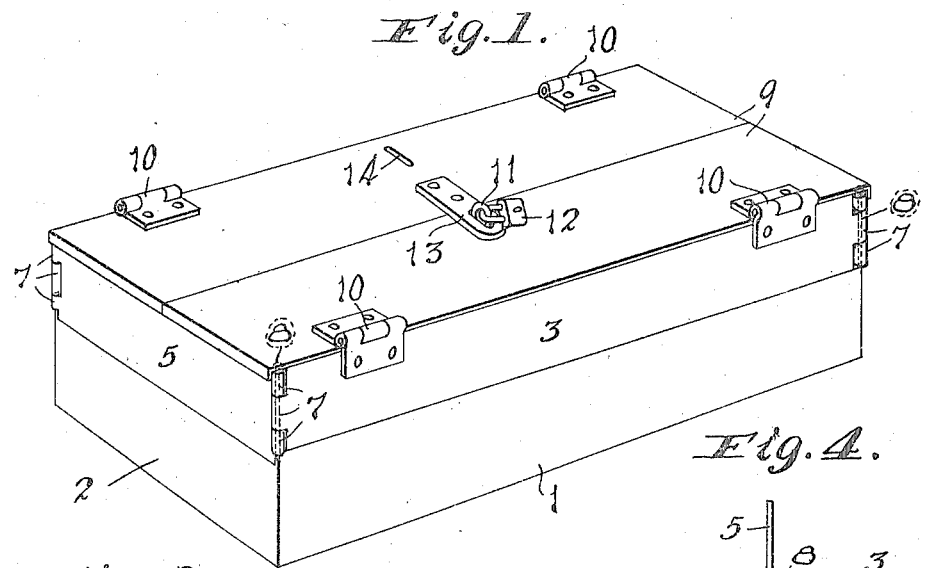
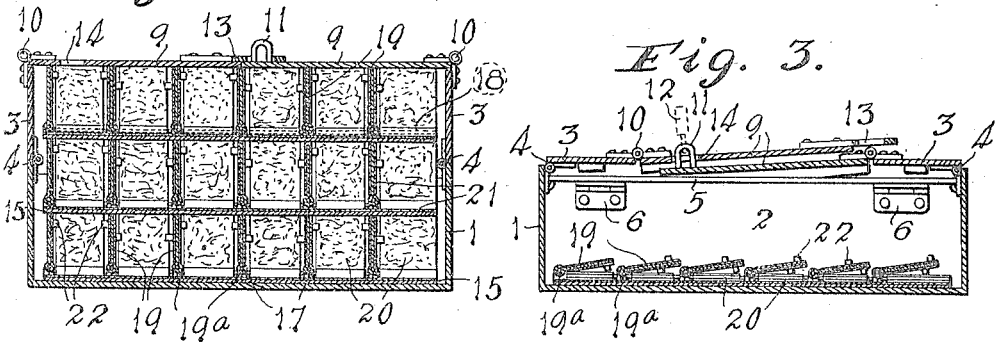
Inventor
L. E. VOIGTS
By N. S. Hill
Attorney

UNITED STATES PATENT OFFICE.

LESTER EARL VOIGTS, OF STREATOR, ILLINOIS.

COLLAPSIBLE EGG-CASE.

1,257,770.  Specification of Letters Patent.  Patented Feb. 26, 1918.

Application filed October 20, 1917. Serial No. 197,625.

*To all whom it may concern:*

Be it known that I, LESTER EARL VOIGTS, a citizen of the United States, residing at Streator, in the county of La Salle, State of Illinois, have invented a new and useful Collapsible Egg-Case; and I do hereby declare the following to be a full, clear, and exact description of the invention, such as will enable others skilled in the art to which it appertains to make and use the same.

The present invention relates to a collapsible egg packing device, and has for its object to provide a device of this character which enables eggs to be safely packed for shipment and which embodies novel features of construction whereby it can be readily collapsed into a small amount of space and returned at small expense to the original shipper.

Further objects of the invention are to provide a device of this character which is comparatively simple and inexpensive in its construction, which can be quickly set up in operative position to receive eggs for shipment or collapsed into a small amount of space, and which will enable the eggs to be shipped and handled with a minimum amount of breakage.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of a collapsible crate which is suitably constructed for the reception of the collapsible egg receiving trays.

Fig. 2 is a transverse sectional view through the crate with a series of superposed egg carrying trays in operative position.

Fig. 3 is a similar view showing the crate as collapsed and also showing one of the collapsed egg receiving trays within the crate.

Fig. 4 is a fragmentary plan view of one of the upper corners of the crate.

Fig. 5 is a perspective view of a portion of one of the egg receiving trays, showing the manner of mounting the collapsible partitions thereon, portions being broken away and shown in section to illustrate more clearly the details of construction.

Fig. 6 is a horizontal sectional view through a pair of the intersecting partition members of one of the trays, showing the latch members for holding the partitions in a vertical position when the tray is in use.

Corresponding and like parts are referred to in the following description and indicated in all the views of the drawings by the same reference characters.

The invention includes the provision of a collapsible case and a series of collapsible egg receiving trays adapted to be assembled within the crate in a superposed relation. A suitable form of crate is shown by Fig. 1, said crate being formed with a comparatively shallow base having sides 1 which extend upwardly slightly higher than the ends 2. Side extensions 3 are hingedly connected at 4 to the upper edges of the sides 1, end extensions 5 being similarly connected by hinges 6 to the ends 2, the said end extensions being adapted to fold inwardly under the side extensions when the crate is collapsed, as indicated by Fig. 3. The meeting ends of the end and side extensions are shown as provided with complemental eyes 7 which are adapted to receive locking pins 8 to hold the extensions rigidly in operative position when the crate is extended for use. Cover sections 9 are hingedly connected at 10 to the side extensions 3, one of the cover sections being provided at its swinging edge with a staple member 11 which is adapted to be engaged by a padlock 12, being inserted through a hasp member 13 on the other cover section when the crate is extended, as indicated by Fig. 1, or through a slot 14 toward the rear edge of the other cover member, when the crate is collapsed, as indicated by Fig. 3.

The collapsible trays which are adapted to be assembled in a superposed relation within the crate each include a sheet metal base plate 15 which has a series of tongues stamped therefrom and looped upwardly to provide eyes 16. These eyes are arranged in both longitudinally and transversely extending rows, the eyes of the longitudinally extending rows being in alinement with each other and receiving the longitudinally extending wires 17, while the bases of the eyes or looped strips are formed with perforations receiving the transverse wires 18. These two sets of wires 17 and 18 intersect each other and subdivide the upper surface of the base plate into a series of small squares. The wires 17 are arranged at a slightly higher elevation than the wires 18 and have the continuous partitions 19 mounted thereon, the sectional partitions 20 being arranged between the continuous partitions and mounted upon the lower set of wires 18. These partitions may be conveniently formed of sheet metal, the lower edges of the continuous partitions 19 having returned tongues providing eyes 19ª which pivotally receive the wires 18, while the lower edges of the sectional partitions 20 are provided with similar eyes 20ª which pivotally receive the wires 18. With this construction it will be obvious that when the two sets of partitions 19 and 20 are swung upwardly into a vertical position they will provide cells for the reception of eggs, although the partitions can be collapsed against the base plate by first swinging the sectional partitions 20 downwardly between the continuous partitions 19, and then folding the continuous partitions down upon the sectional partitions.

Both the base plate and partitions are preferably provided with a covering 21 of felt to minimize the breakage of eggs due to direct engagement thereof with the sheet metal, and the continuous partitions 19 have spring latch members 22 stamped therefrom and pressed outwardly in opposite directions for engagement with the edges of the sectional partitions 20 to lock the partitions in an upright position when the trays are in use. These spring latch members are shown as arranged in superposed pairs which are at different elevations, one latch member being pressed outwardly upon one side of the partition, while the other latch member is pressed outwardly upon the other side of the partition. This arrangement will hold the partitions in proper position when the trays are filled with eggs, although the partitions can be collapsed without difficulty when it is desired to pack them in the collapsed crate for return to the original shipper. While I have only shown three of the egg receiving trays as arranged within the crate, it will be obvious that the crates can be made of any desired size and shape, and that the number of trays used within a crate can be either increased or decreased, as may be found desirable.

Having thus described the invention, what I claim as new and desire to secure by Letters Patent, is:—

1. A collapsible egg packing tray including a base plate, intersecting wires extending across the base plate, one set of wires being arranged at a higher elevation than the other set of wires, continuous partitions pivotally mounted on the higher set of wires, and intersecting partition sections pivotally mounted upon the lower set of wires and arranged between the continuous partitions for coöperation therewith to provide cells, the partition sections being foldable against the base and the continuous partitions being foldable against the partition sections.

2. A collapsible egg packing tray including a base plate, intersecting wires extending across the base plate, one set of the wires being at a higher elevation than the other set of wires, continuous partitions pivotally mounted upon the higher set of wires, intersecting partition sections pivotally mounted upon the lower set of wires and arranged between the continuous partitions for coöperation therewith to provide cells, and latch means for locking the partitions and partition sections in a raised position, the partition sections being foldable against the base plate and the continuous partitions being foldable against the partition sections.

3. A collapsible egg packing tray including a base plate, a series of intersecting wires extending across the base plate, one set of wires being arranged at a higher elevation that the other set of wires, continuous partitions pivotally mounted on the higher set of wires, intersecting partition section pivotally mounted upon the lower set of wires and arranged between the continuous partitions for coöperation therewith to provide cells, and spring latch tongues stamped from the continuous partitions and bent outwardly upon opposite sides thereof for engagement with the edges of the partition sections to hold the members in an upright position, the partition sections being foldable against the base plate and the continuous partitions being foldable against the partition sections.

4. A collapsible egg packing tray including a base plate, looped strips extending upwardly from the base plate and arranged in longitudinal and transverse alinement, an upper set of parallel wires extending through the looped strips, a lower set of intersecting wires extending through the bases of the looped strips, continuous partitions pivotally mounted on the upper set of wires, and intersecting partition sections pivotally mounted on the lower set of wires and arranged between the continuous partitions for coöperation therewith to provide cells, the partition sections being foldable against the base plate and the continuous partitions being foldable against the partition sections.

5. A collapsible egg packing tray, including a base plate, a series of looped strips extending upwardly from the base plate and arranged in longitudinal and transverse alinement, an upper set of parallel wires extending through the looped strips, a lower set of intersecting wires extending through the bases of the looped strips, continuous partitions pivotally mounted upon the upper set of wires, short partition sections pivotally mounted upon the lower set of wires and arranged between the continuous partitions for coöperation therewith to provide cells, and spring latch tongues stamped from the continuous partition sections and bent outwardly in opposite directions for engagement with the edges of the short partition sections to hold the members in an upright position, the partition sections being foldable against the base plate and the continuous partitions being foldable against the partition sections.

6. A collapsible egg packing tray, including a base plate having a series of tongues stamped therefrom and looped upwardly, said looped tongues being arranged in longitudinal and transverse alinement, an upper set of parallel wires extending through the looped tongues, a lower set of intersecting parallel wires extending through the bases of the looped tongues, continuous partitions pivotally mounted upon the upper set of wires, intersecting partition sections pivotally mounted upon the lower set of wires and arranged between the continuous partitions for coöperation therewith to provide cells, a protective fabric covering for the base plate and partition members, and spring latch members for locking the partition members in an upright position, the short partition sections being foldable against the base plate, while the continuous partitions are foldable against the partition sections.

In testimony whereof I have signed my name to this specification in the presence of the two subscribing witnesses.

LESTER EARL VOIGTS.

Witnesses:
R. D. KLINE,
E. CULLOM.

Copies of this patent may be obtained for five cents each, by addressing the "Commissioner of Patents, Washington, D. C."